United States Patent
Zanzig

(10) Patent No.: US 7,262,254 B2
(45) Date of Patent: *Aug. 28, 2007

(54) TIRE WITH LOW VOLATILE ALCOHOL EMISSION RUBBER TREAD WITH COMPOSITIONAL LIMITATIONS

(75) Inventor: David John Zanzig, Bertrange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/212,245

(22) Filed: Aug. 26, 2005

(65) Prior Publication Data

US 2006/0063879 A1    Mar. 23, 2006

Related U.S. Application Data

(60) Provisional application No. 60/612,353, filed on Sep. 23, 2004.

(51) Int. Cl.
*C08F 136/14* (2006.01)
*C08F 136/06* (2006.01)

(52) U.S. Cl. .............. 525/331.9; 525/332.6; 525/333.1; 525/333.3; 525/342; 525/343; 525/232; 525/236; 524/495; 524/492; 524/493

(58) Field of Classification Search ........ 525/332.6, 525/331.9, 333.1, 333.3, 232, 236, 342, 343; 524/495, 492, 493
See application file for complete search history.

(56) References Cited

U.S. PATENT DOCUMENTS

| | | | |
|---|---|---|---|
| 3,692,812 A | 9/1972 | Berger | 260/448.8 |
| 4,474,908 A | 10/1984 | Wagner | 523/213 |
| 5,094,829 A | 3/1992 | Krivak et al. | 423/339 |
| 5,750,610 A | 5/1998 | Burns et al. | 524/434 |
| 5,780,538 A | 7/1998 | Cohen et al. | 524/496 |
| 6,998,448 B2 * | 2/2006 | Zanzig et al. | 525/333.2 |
| 2002/0055568 A1 | 5/2002 | Cruse et al. | 524/262 |
| 2004/0054032 A1 * | 3/2004 | Zanzig et al. | 523/200 |

FOREIGN PATENT DOCUMENTS

| | | |
|---|---|---|
| EP | 1142730 | 10/2001 |
| EP | 1 400 559 A1 * | 3/2004 |
| EP | 1400559 | 3/2004 |

OTHER PUBLICATIONS

European Search Report.

* cited by examiner

*Primary Examiner*—David W. Wu
*Assistant Examiner*—Rip A. Lee
(74) *Attorney, Agent, or Firm*—Henry C. Young, Jr.

(57) ABSTRACT

The invention relates to a tire having a tread of a rubber composition with compositional limitations containing minimal, if any, of in situ formed volatile alcohol byproduct. The tread component rubber composition contains a combination or pre-hydrophobated silica reinforcement and siloxane functionalized styrene/butadiene copolymer elastomer. The pre-hydrophobated silica is prepared, prior to mixing with the elastomer(s), by reacting hydroxyl groups (e.g. silanol groups) contained on the surface of a precipitated silica with an alkoxyorganomercaptosilane or with a bis-3(triethoxysilylpropyl)polysulfide which contains an average of from 2 to 4 connecting sulfur atoms in its polysulfidic bridge to form a composite thereof which may optionally include an alkyl silane. The volatile alcohol byproduct (e.g. ethanol) therefrom is thereby removed from the pre-hydrophobated silica composite prior to its introduction into the rubber composition(s).

2 Claims, No Drawings

TIRE WITH LOW VOLATILE ALCOHOL EMISSION RUBBER TREAD WITH COMPOSITIONAL LIMITATIONS

The Applicants hereby incorporate by reference prior U.S. Provisional Application Ser. No. 60/612,353, filed on Sep. 23, 2004.

FIELD OF THE INVENTION

The invention relates to a tire having a tread of a rubber composition with compositional limitations containing minimal, if any, of in situ formed volatile alcohol byproduct. The tread component rubber composition contains a combination or pre-hydrophobated silica reinforcement and siloxane functionalized styrene/butadiene copolymer elastomer. The pre-hydrophobated silica is prepared, prior to mixing with the elastomer(s), by reacting hydroxyl groups (e.g. silanol groups) contained on the surface of a precipitated silica with an alkoxyorganomercaptosilane or with a bis-3(triethoxysilylpropyl)polysulfide which contains an average of from 2 to 4 connecting sulfur atoms in its polysulfidic bridge to form a composite thereof which may optionally include an alkyl silane. The alkoxyorganomercaptosilane may alternately be in a form of a blocked alkoxyorganomercaptosilane. The volatile alcohol byproduct (e.g. ethanol) therefrom is thereby removed from the pre-hydrophobated silica composite prior to its introduction into the rubber composition(s).

BACKGROUND OF THE INVENTION

Tires are a complex structural combination of many components of various physical properties and of various compositions. Two of such components are a circumferential tire tread which is intended to be ground-contacting and pair of tire sidewalls which conventionally extend between the tire's spaced apart bead portions radially outward to the peripheral edges of the tire tread.

Tire treads and tire sidewalls are normally intended to present very different properties for a tire. For example, tire treads, which are intended to be ground contacting, are normally expected to provide physical properties such as, for example, traction and resistance to abrasion. For example, tire sidewalls, which are not intended to be ground contacting, are normally expected to provide physical properties such as, for example, resistance to flex fatigue and scuff resistance.

For this invention, it is desired to present a tire with a tread, and optionally its sidewalls, which contains silica reinforcement in which the silica reinforcement is provided as a pre-formed silica/coupler composite, namely a pre-hydrophobated precipitated silica.

In practice, various tires with silica reinforced rubber treads have been described and manufactured. Some tires have been mentioned which have silica containing rubber sidewall(s). Some tires have been mentioned which have both treads and associated sidewalls which are composed of silica containing rubber compositions.

Alkoxysilane-polysulfide based coupling agents (e.g. bis (3-triethoxysilylpropyl)polysulfides) are often used to aid in coupling of precipitated silicas to diene-based elastomers in a rubber composition. However, such ethoxysilane moieties rely upon reaction with hydroxyl groups (e.g. silanol groups) contained on the surface of the precipitated silica which in turn produces a volatile alcohol byproduct (e.g. ethanol) in situ within the rubber composition itself.

For this invention, it is desired to provide a tire with a tread of a rubber composition which has reduced, or substantially eliminated, volatile alcohol (e.g. ethanol) evaporative emission.

Accordingly, a tire is provided with a tread of a rubber composition which contains a pre-hydrophobated silica reinforcement and siloxane functionalized styrene/butadiene copolymer rubber.

For said silica pre-hydrophobation purposes, the precipitated silica may be pre-treated with a bis(3-triethoxysilylpropyl)polysulfide or alkoxyorganomercaptosilane, optionally including an alkoxysilane, prior to its addition to the tread rubber composition. The alkoxyorganomercaptosilane may alternately be in a form of a blocked alkoxyorganomercaptosilane. One aspect of such pre-hydrophobation of the precipitated silica is to reduce, or substantially eliminate, evolution of as volatile alcohol (ethanol) during the actual mixing of the silica with the rubber compositions in a rubber mixing operation.

From a historical perspective, preparation of tires have been suggested with a rubber component which contains a precipitated silica which is hydrophobated in situ within the elastomer host by addition of both a coupling agent, as an organomercaptosilane, and an alkyl silane. For example, see U.S. Pat. No. 4,474,908. However, for this invention, it is required that the precipitated silica is pre-hydrophobated to substantially reduce the hydroxyl group content on its surface prior to its addition to the rubber composition.

From a historical perspective, preparation of tires has also been suggested with a rubber component in which both a coupling agent, as an organosilyl polysulfide, and an alkylsilane are individually added to a silica-containing rubber composition to treat the amorphous silica in-situ within the rubber host with both a hydrophobating agent (the alkylsilane) and a silica coupler (the organosilyl polysulfide compound). For example, see U.S. Pat. No. 5,780,538.

From a historical perspective, preparation of tires has further been suggested where one or more of its components (e.g. tread and sidewall) are silica reinforced wherein the silica is pre-treated with a coupling agent and, optionally, a substituted alkylsilane, prior to addition of the silica to the associated rubber composition with an expected result of reduction of alcohol evolution upon mixing the silica with the rubber composition. For example, see European patent publication EP-A-1 142 730 where the silica is pre-hydrophobated with an alkylsilane (e.g. Formula I therein) such as, for example, an alkoxyorganosilane which will release an volatile alcohol byproduct (e.g. ethanol) upon reaction with alcohol groups (e.g. silanol groups) contained on the surface of a precipitated silica and an alkoxyorganomercaptosilane (e.g. Formula II therein) which may also release an volatile alcohol byproduct upon reaction with alcohol groups (e.g. silanol groups) contained on the surface of a precipitated silica. Various alternative blocked alkoxyorganomercaptosilanes has been suggested, for example, in PCT/US98/17391 and U.S. Pat. No. 3,692,812 patent publications.

Representative examples of such alkylsilanes, and particularly alkoxyalkylsilanes are provided in said European patent publication for the pre-hydrophobation of the silica (from its Formula I) are trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative examples of such alkoxyorganomercaptosilanes are mentioned in said European patent publication for the pre-hydrophobation of the silica (from its Formula (II) as triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, it is recognized that precipitated silica aggregates are typically hydrophilic (water attracting) in nature and, in order to aid in dispersing the silica aggregates in various rubber compositions, it is sometimes desired to make the silica aggregates more hydrophobic (water repelling) in nature and therefore more compatible with the rubber. Accordingly, and as described in the aforesaid U.S. Pat. Nos. 4,474,908 and 5,780,538, a hydrophobating agent may be added to a rubber composition in addition to the precipitated silica to combine with the silica in-situ within the rubber host to make the silica more hydrophobic in nature.

However, it is considered herein, for the tire tread application where properties are desired by silica reinforcement are often sought, and particularly where a good homogeneous dispersion in the rubber host is often sought, that an in-situ modification of the amorphous silica within a viscous rubber host on a hit and miss basis, under relatively harsh high sheer and high temperature conditions is a relatively inefficient procedure of modifying the amorphous silica for use in rubber compositions which are intended to be silica reinforced, particularly where both an organosilane and alkyl silane are used which would compete within the rubber composition for reaction sites on the silica surface and particularly where an alcohol byproduct is formed in situ within the rubber composition which is then available as an evaporative emission.

Accordingly in one aspect, it is proposed herein to provide a tire having a tread comprised of individual rubber compositions which contain particulate pre-hydrophobated precipitated silica aggregates where the silica aggregates are added to, or mixed with, the individual rubber compositions in a pre-hydrophobated form instead of more inefficiently subsequently hydrophobating the silica aggregates in situ within the elastomer host, thus essentially eliminating formation of a volatile alcohol byproduct (e.g. ethanol) therefrom in situ within the rubber composition itself and thereby essentially eliminating evaporative emission of such in situ formed volatile alcohol.

Historically, according to U.S. Pat. No. 5,750,610, an organosilicate-modified silica gel may be hydrophobated with both an organomercaptosilane and alkyl silane and the dried treated organosilicate-modified silica gel blended with natural rubber and/or synthetic rubber. This invention is not intended to be directed to use of such modified silica gels which, for the purposes of this invention, are intended to be distinguished from rubber reinforcing precipitated silica aggregates for this invention.

A general description of silica gel and precipitated silica may be found, for example, in the *Encyclopedia of Chemical Technology*, Fourth Edition (1997), Volume 21, Kirk-Othmer in Pages 1020 through 1023.

A further descriptive discussion of silica gels and precipitated silicas may be found, for example, in U.S. Pat. No. 5,094,829.

A significant aspect of this invention is the preparation of a tire with reduced volatile alcohol based evaporative emission which requires a tread component of a rubber composition which contains a combination of a siloxane functionalized elastomer and pre-hydrophobated precipitated silica aggregates, instead of using non pre-hydrophobated precipitated silica aggregates which are then hydrophobated in situ within the elastomer host, to produce a tire with reduced volatile alcohol evaporative emissions. It is considered that such tread composition is a departure from past practice, particularly where volatile alcohol based evaporative emission is taken into consideration, for a tire with acceptable performance characteristics.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, a tire is provided with a circumferential tread of a rubber composition comprised of, based upon parts by weight per 100 parts by weight rubber (phr):

(A) about 30 to about 80 phr of a siloxane functionalized styrene/butadiene copolymer elastomer composite (SBR composite) comprised of a styrene/butadiene copolymer elastomer (SBR-1) and a siloxane functional styrene/butadiene copolymer elastomer (SBR-2) which contains at least silicon atom within said elastomer with associated pendent alkoxy groups, and optionally hydroxyl groups, from said silicon atom, as a part of the (SBR-2) elastomer chain to thereby divide said elastomer into at least two segments thereof (SBR-2A and SBR-2B) with the silicon atom containing said siloxy group, and optionally said hydroxyl group, therebetween, wherein said SBR composite is thereby comprised of a polymodal (e.g. primarily bimodal) molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said elastomer contains from zero to a maximum of ten weight percent of at least one additional styrene/butadiene copolymer elastomer (SBR-3) pendent to said silicon atom and having an number average molecular weight (Mn) of greater than 550,000, alternatively between 550,000 and about 650,000; and having a styrene contend and Tg value in said range for said SBR-1 and SBR-2;

(B) about 20 to about 70 phr of at least one additional conjugated diene based elastomer (other than said siloxane functionalized styrene/butadiene copolymer elastomer) selected from at least one of polymers of at least one of isoprene and 1,3-butadiene and copolymers of styrene with at least one of isoprene and 1,3-butadiene;

(C) about 10 to about 120, alternately about 40 to about 100, phr of reinforcing filler for said tread rubber composition wherein said reinforcing filler is comprised of:
  (1) about 40 to about 100, alternately about 50 to about 80, phr of particulate, pre-hydrophobated precipitated silica aggregates having (prior to said pre-hydrophobation) a BET surface area in a range of from about 150 to about 170 m²/g, preferably having an average total of from about 15 to about 18 hydroxyl groups per square nanometer of said silica aggregates and a ratio of geminal hydroxyl groups to said average total hydroxyl groups in a range of about 0.25/1 to about 0.3/1, and (2) zero to about 60, alternately about 3 to about 30, phr of rubber reinforcing carbon black; and wherein said pre-hydrophobated precipitated silica aggregates for said tread rubber composition are prepared by treating precipitated silica aggregates, with (a) an alkoxyorganomercaptosilane, alternately in a form of a blocked alkoxyorganomercaptosilane, or (b) an alkoxyorganomercaptosilane, alternately in a form of a blocked alkoxyorganomercaptosilane, and an alkylsilane in a weight ratio of said alkoxyorganomercaptosilane to said substituted alkylsilane in a range of from 10/90 to 90/10, or (c) a bis(3-triethoxysilylpropyl)polysulfide having an average of from 2 to about 4, preferably an average of from 2 to about 2.6 or from about 3.4 to about 3.8 connecting sulfur atoms in its polysulfidic bridge, or (d) a bis(3-triethoxysilylpropyl)polysulfide having an average of from 2 to about 4, preferably an average or from 2 to about 2.6 or from about 3.4 to about 3.8 connecting sulfur atoms in its polysulfidic bridge and an alkylsilane in a weight ratio of said bis(3-triethoxysilylpropyl) polysulfide to said alkylsilane in a range of from 10/90 to 90/10:

wherein said alkylsilane is of the general Formula (I):

X$_n$—Si—R$_{4-n}$ (I)

where R is an alkyl radical having from one to 18, preferably from one to 8, carbon atoms selected from, for example, methyl, ethyl, isopropyl, n-butyl and octadecyl radicals, n is a value of from 1 to 3 and X is:

(i) a halogen radical selected from chlorine and bromine radicals, preferably a chlorine radical, or (ii) an (R¹O)—group, namely an alkoxy group, where R¹ is an alkyl radical having from one to 3 carbon atoms selected from, for example, methyl, ethyl and isopropyl radicals, preferably from methyl and ethyl radicals, and more preferably an ethyl radical, and wherein said alkoxyorganomercaptosilane is of the general formula (II):

(Y)$_n$(R²O)$_{3-n}$—Si—R³—SH (II)

where Y is a radical selected from chlorine or bromine radicals, preferably a chlorine radical, and alkyl radicals having from one to 16, preferably from one to 4, carbon atoms, preferably selected from methyl, ethyl, n-propyl and n-butyl radicals; where R² is an alkyl radical having from one to 16, preferably from one to 4 carbon atoms, preferably selected from methyl and ethyl radicals and R³ is an alkylene radical having from one to 16, preferably from one to 4, carbon atoms, preferably a propylene radical; n is a value from zero to 3, preferably zero.

Representative of alternative blocked alkoxyorganomercaptosilanes are of the general formula (III):

(X₃Si)$_n$—G—S—C(=O)—Y (III)

wherein, for said Formula (III):

The radical Y is independently selected from hydrogen, and straight, cyclic or branched alkyl radicals containing from 1 to 18 carbon atoms and which may or may not contain unsaturation, alkenyl groups, aryl groups, aralkyl groups;

wherein G is independently selected from divalent groups derived from substitution of alkyl, alkenyl, aryl or aralkyl group(s) wherein G can contain from 1 to 18 carbon atoms, provided however that G is not such that said mercaptoalkoxysilane contains an alpha-, or beta-unsaturated carbonyl including a carbon-to-carbon double bond next to the thiocarbonyl group;

wherein X is independently selected from the group consisting of —Cl, —GR, RO—, RC(=O)—, R₂C=NO—, R₂NO—, or R₂N—, —R, —(OSiR₂), (OSiR₃), wherein R is selected from hydrogen, from saturated straight chain, cyclic and branched alkyl radicals containing from 1 to 18 carbon atoms, from unsaturated straight chain, cyclic and branched alkyl radicals containing from 2 to 18 carbon atoms, and from alkenyl groups, aryl groups and aralkyl groups; wherein G is as above and wherein at least one X is not an —R radical.

An optional unblocking agent may be included as a material capable of unblocking the blocked alkoxyorganomercaptosilane to enable the mercapto group, or moiety, of the alkoxyorganomercaptosilane to interact with the diene based elastomer(s). It is to be appreciated that choice of the unblocking agent will depend upon the blocking group, or moiety, used to block the chemical activity of the alkoxyorganomercaptosilane itself insofar as interacting with a diene-based elastomer is concerned, which would be readily understood by one having skill in such art.

The unblocking agent for said blocked alkoxyorganomercaptosilane is preferably selected from at least one of N,N'-diphenylguanidine and N,N'-di-ortho-tolylguanidine as well as, for example, hexamethylenetetramine and 4,4'-diaminodiphenylmethane.

For said blocked alkoxyorganomercaptosilane, X is preferably R₂O—.

R₁ preferably has a primary carbon attached to the carbonyl as an alkyl group which contains from 2 to 12, preferably from 6 through 8, carbon atoms; and where G is a divalent hydrocarbon radical.

Representative examples of G are, for example, —(CH₂)$_n$— radicals where n is a value of from 1 to 12, diethylene cyclohexane, 1,2,4-triethylene cyclohexane, and diethylene benzene radicals. In practice, it is preferred that the sum of the carbon atoms within the G and Y groups is from 4 to 24, more preferably from 6 to 18. It is considered herein that such amount of carbon atoms in the blocked mercaptoalkoxysilane may aid in facilitating the dispersion of the composite of pre-reacted silica into the diene-based elastomer(s), whereby it is envisioned that a balance of physical of properties in the cured reinforced elastomer(s) is improved.

In practice, the R group of the blocked mercaptoalkoxysilane is preferably selected from hydrogen atom and saturated alkyl groups having from 1 through 18 carbon atoms wherein, alternately said R groups are methyl groups or wherein, alternately one or two of said R groups is a methyl group and the remainder of said R groups are saturated alkyl groups having from 3 through 18 carbon atoms.

Representative examples of X are, for example, methoxy, ethoxy, isobutoxy, propoxy, isopropoxy, acetoxy and oximato groups. Preferably, X is selected from methoxy, acetoxy and ethoxy groups. In practice, at least one X must be reactive (i.e., hydrolyzable).

In practice, for preferred blocked mercaptoalkoxysilanes, Y is phenyl, cyclohexyl, or straight chain or substituted straight chain alkyl radical having from 3 to 18 carbon atoms. For a more preferred blocked alkoxyorganomercaptosilane, Y is a straight chain or substituted strait chain alkyl radical having from 6 to 18 carbon atoms.

Representative of preferred blocked mercaptoalkoxysilanes are, for example, mercaptoalkoxysilanes where $R_1$ has a primary carbon attached to the carbonyl as an alkyl group which contains from 2 to 12, preferably from 6 through 8, carbon atoms; and where G is a divalent hydrocarbon radical.

Representative examples of G are, for example, $-(CH_2)_n-$ radicals where n is a value of from 1 to 12, diethylene cyclohexane, 1,2,4-triethylene cyclohexane, and diethylene benzene radicals. In practice, it is preferred that the sum of the carbon atoms within the G and Y groups is from 4 to 24, more preferably from 6 to 18. It is considered herein that such amount of carbon atoms in the blocked mercaptoalkoxysilane may aid in facilitating the dispersion of the composite of pre-reacted silica into the diene-based elastomer(s), whereby it is envisioned that a balance of physical of properties in the cured reinforced elastomer(s) is improved.

In practice, the R group of the blocked mercaptoalkoxysilane is preferably selected from hydrogen atom and saturated alkyl groups having from 1 through 18 carbon atoms wherein, alternately said R groups are methyl groups or wherein, alternately one or two of said R groups is a methyl group and the remainder of said R groups are saturated alkyl groups having from 3 through 18 carbon atoms.

Representative examples of X are, for example, methoxy, ethoxy, isobutoxy, propoxy, isopropoxy, acetoxy and oximato groups. Preferably, X is selected from methoxy, acetoxy and ethoxy groups. In practice, at least one X must be reactive (i.e., hydrolyzable).

In practice, for preferred blocked mercaptoalkoxysilanes, Y is phenyl, cyclohexyl, or straight chain or substituted straight chain alkyl radical having from 3 to 18 carbon atoms. For a more preferred blocked alkoxyorganomercaptosilane, Y is a straight chain or substituted strait chain alkyl radical having from 6 to 18 carbon atoms.

In further accordance with this invention, said tire is provided with said tread of said rubber composition with reduced, or substantially eliminated in situ formed volatile alcohol evaporative emission.

In particular, in the practice of this invention, a tire is provided having a tread rubber composition which contains silica reinforcement in which the silica is pre-reacted (pre-hydrophobated) with a coupling agent prior to its introduction to, or mixing with, the rubber composition in order to prevent, or substantially eliminate, in situ formation of alcohol within the rubber composition, and resulting tire, itself.

In one aspect of the invention, the said pre-hydrophobated silica is a pre-hydrophobated precipitated silica for which a volatile alcohol byproduct is produced by such pre-hydrophobation thereof and from which said produced volatile alcohol byproduct is removed therefrom prior to addition of said pre-hydrophobated precipitated silica to the tread rubber composition to significantly produce a volatile alcohol byproduct therefrom formed in situ within the rubber composition.

In practice, it is also preferred that the rubber composition of said tread and sidewall which contains the pre-hydrophobated silica does not contain additional silica (silica other than said pre-hydrophobated silica) which contains hydroxyl groups on its surface.

A significant aspect of this invention is the significant reduction in volatile alcohol based evaporative emission in the manufacture and use of the tire, namely significant reduction or elimination of in situ formed volatile alcohol from the external tread rubber component of the tire.

This is considered herein to be significant because volatile alcohol (e.g. ethanol) may be a minor, although perhaps significant depending upon the tire manufacturing process and the tire itself, volatile emission from tires which have silica (together with coupling agents which form volatile alcohol byproducts) reinforced tread.

Another significant aspect of this invention is that tire performance is maintained at optimum level through the use of pre-hydrophobated silica in the tread rubber composition which contain saturated rubbers. This is considered herein to be significant because without use of such pre-hydrophobated silica and saturated rubbers, neither a silica reinforced tread nor a black sidewall could be provided which combines elimination of in situ formed volatile alcohol from the tread and in situ formed alcohol evaporative emission from the sidewall with excellent tire performance.

A further significant aspect of the invention is the use of a combination of the said siloxane functionalized styrene/butadiene (SBR) elastomer composite and the pre-treated precipitated silica having the relatively low BET surface area in a range of from about 100 to about 120 $m^2/g$ (thus indicating a relatively larger size for the participated silica aggregates) which is observed herein to promote an increase in the rubber composition's (particularly a rubber composition comprised of said siloxane functionalized SBR composite and cis 1,4-polybutadiene elastomer) rebound property (23° C. and 100° C. rebound properties) which is predictive of a reduced rolling resistance for a pneumatic tire having a tread of such rubber composition with an attendant increase in fuel economy for an associated vehicle having such tires.

The BET surface area of a precipitated silica may be determined, for example, by measuring its BET (nitrogen) surface area of precipitated according to ASTM D 1993-91, *Standard Test Method for Precipitated Silica-Surface Area by Multipoint BET Nitrogen Adsorption* which relates to the conventional theory described by Brunauer, Emmett and Teller in the *Journal of the American Chemical Society*, Volume 60, (1938), Page 309.

Representative substituted alkylsilanes, particularly alkoxyalkylsilanes, for the pre-hydrophobation of the silica, particularly pre-hydrophobation of a precipitated silica, are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative alkoxyorganomercaptosilanes for the pre-hydrophobation of the silica are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Representative of alternative blocked alkoxyorganomercaptosilanes for the pre-hydrophobation of the silica are, for example, 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl-1-ethyl)-4-thioacetylnorbornene; 1-(1-oxo-2-thia-5-triethoxysilylpenyl)benzoic acid; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctoate; 3-triethoxysilyl-1-propyl thiopalmitate; 3-triethoxysilyl-1-propyl thiooctoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; 3-ethoxydidodecyloxy-1-propyl thioacetate; 3-ethoxyditetradecyloxy-1-propyl thioacetate; 3-ethoxydidodecyloxy-1-propyl-thiooctoate and 3-ethoxyditetradecyloxy-1-propyl-thiooctoate.

Various methods of preparation of various blocked alkoxyorganomercaptosilanes may be found, for example, in the aforesaid PCT/US98/17391 and U.S. Pat. No. 3,692,812 patent publications as well as in various literature publications such as, for example, in Gornowicz, G., "Preparation of Silylalkanethiols", *J. Org. Chem.*, Volume 33, No. 7, Jul., 1968; Vorkonov, M. G., et al., *Trialkoxysilylalkanethiols and Bis(trialkoxysilylakyl)sulfides*, Izvestiya Akademii Nauk SSSR and Seriya Khimicheskeya, No. 8, Pages 1849 through 1851, Aug. 1977.

It is to be appreciated that a reaction of said alkoxyalkylsilanes and said alkoxyorganomercaptosilanes with alcohol groups (e.g. silanol groups) contained on the surface of a synthetic precipitated silica will be expected to form an alcohol byproduct. Such alcohol byproduct, when formed, is removed from the pre-hydrophobated precipitated silica product prior to its addition to the rubber composition for said tire tread and said tire sidewall.

In the practice of this invention, the tread of the tire may be a rubber composition comprised of various additional conjugated diene based elastomers (in addition to said siloxane functionalized styrene/butadiene composite elastomer). Such diene-based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

Representative examples of said additional elastomers are, for example, cis 1,4-polyisoprene rubber (natural and synthetic), cis 1,4-polybutadiene rubber, high vinyl polybutadiene rubber having a vinyl 1,2 content in a range of about 20 percent to about 90 percent, styrene/butadiene copolymer (SBR) rubber (aqueous emulsion or organic solution polymerization prepared copolymers) and including high vinyl organic solvent polymerization prepared SBR having a vinyl 1,2-content in a range of about 20 to about 90 percent based on its polybutadiene derived portion and a bound styrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

In one aspect of the invention, the diene-based elastomer may be comprised of an organic solvent solution polymerization derived high trans 1,4-styrene/butadiene copolymer having at 70 percent trans 1,4-isomeric content of at least 70 percent based upon the polybutadiene component of the copolymer.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black and pre-hydrophobated silica as already hereinbefore discussed. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated herein.

The tires can be built, shaped, molded and cured by various methods which will be readily apparent to those having skill in such art.

The following examples are presented in order to illustrate but not limit the present invention. The parts and percentages are by weight unless otherwise noted.

EXAMPLE I

Samples of rubber compounds (compositions) were prepared and referred to herein as Samples A through D. Sample A is a Control rubber sample.

The following Table 1 illustrates the respective rubber compositions.

The materials were mixed in a sequential two-step mixing process, namely a non-productive mixing step, followed by a productive mixing step in an internal rubber mixer, in which all of the ingredients, except for sulfur and accelerators, were mixed in the first, non-productive mixing step and the sulfur and accelerators were added in the subsequent productive mixing step in an internal rubber mixer. The rubber mixtures were dumped from the respective rubber mixer and cooled to below 40° C. between mixing steps. Such sequential procedural non-productive and productive rubber mixing steps are well known to those having skill in such art.

TABLE 1

| | Samples | | | |
|---|---|---|---|---|
| | Control A | B | C | D |
| Non-Productive Mixing Step | | | | |
| Styrene/butadiene rubber A (E-SBR-A)[1] | 30 | 0 | 0 | 0 |
| Styrene/butadiene rubber B (E-SBR-B)[2] | 30 | 0 | 0 | 0 |
| Siloxane functionalized SBR composite[3] | 0 | 60 | 60 | 60 |
| Cis 1,4-polybutadiene rubber[4] | 40 | 40 | 40 | 40 |
| Precipitated silica A, BET = 185 m²/g[5] | 76 | 76 | 0 | 0 |
| Precipitated silica B, BET = 163 m²/g[6] | 0 | 0 | 83 | 0 |
| Pre-hydrophobated precipitated silica B[7] | 0 | 0 | 0 | 84.7 |
| Coupling agent[8] | 12 | 12 | 9 | 4.1 |
| Processing oil and waxes[9] | 6 | 6 | 6 | 6 |
| Fatty acid (primarily stearic acid) | 3 | 3 | 3 | 3 |
| Zinc oxide | 2.5 | 2.5 | 2.5 | 2.5 |
| Productive Mixing Step | | | | |
| Sulfur | 2.2 | 2 | 2 | 2 |
| Accelerators[11] | 3.7 | 3.4 | 3.4 | 3.4 |

[1]Emulsion polymerization prepared styrene/butadiene copolymer (E-SBR-A) as PLF1712 ™ from the Goodyear Tire & Rubber Company having a bound styrene content of about 23.5 percent and a Tg of about −52° C. Said E-SBR-A contains 37.5 parts by weight rubber processing oil per 100 parts by weight of the E-SBR-A and is reported in Table 1 on a dry weight (without the processing oil) basis.
[2]Emulsion polymerization prepared styrene/butadiene copolymer (E-SBR-B) as PLF1721 ™ from the Goodyear Tire & Rubber Company having a bound styrene content of about 40 percent and a Tg of about −30° C. Said E-SBR-B contains 37.5 parts by weight rubber processing oil per 100 parts by weight of the E-SBR-B and is reported in Table 1 on a dry weight basis.
[3]Siloxane functionalized styrene/butadiene copolymer elastomer composite (SBR composite) obtained as T596 ™ from the JSR (Japan Synthetic Rubber) Corporation understood to be comprised of a styrene/butadiene copolymer elastomer (SBR-1) and a siloxane functional styrene/butadiene copolymer elastomer (SBR-2) which contains at least silicon atom within said elastomer with associated pendent alkoxy groups, and optionally hydroxyl groups, from said silicon atom, as a part of the (SBR-2) elastomer chain to thereby divide said elastomer into at least two segments thereof (SBR-2A and SBR-2B) with the silicon atom containing said siloxy group, and optionally said hydroxyl group, therebetween, wherein said SBR composite is thereby comprised of a polymodal (e.g. primarily bimodal) molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said elastomer contains from zero to a maximum of ten weight percent of at least one additional styrene/butadiene copolymer elastomer (SBR-3) pendent to said silicon atom and having an number average molecular weight (Mn) of greater than 550,000, alternatively between 550,000 and about 650,000; and having a styrene content and Tg value in said range for said SBR-1 and SBR-2. The siloxane functionalized SBR composite was oil extended with 37.5 parts by weight of oil per 100 parts of the elastomer composite and is reported in Table 1 on a dry weight basis.
[4]Cis 1,4-polybutadiene rubber as Budenel207 ™ from The Goodyear Tire & Rubber Company TABLE 1-continued

| | Samples | | | |
|---|---|---|---|---|
| | Control A | B | C | D |

[5]Precipitated silica as Zeopol 8745 ™ from the J. M. Huber Corporation, reportedly having an average total of about 13 hydroxyl groups per square nanometer of silica surface area and a ratio of geminal hydroxyl groups to said average total of about 0.23/1; a CTAB value of about 145 m²/g and a BET value of about 185 m²/g.
[6]Precipitated silica as Zeopol 8715 from J. M Huber Corporation reportedly characterized by having an average total of about 18 hydroxyl groups per square nanometer surface of said silica and a ratio of geminal hydroxyl groups to said average total of about 0.27/1, a CTAB value of about 94 m²/g and a BET value of about 163 m²/g.
[7]Pre-hydrophobated silica as said Zeopol 8715 silica understood to have been pre-hydrophobated by pre-treating said silica (prior to blending the silica with the elastomers) with bis(3-triethoxysilylpropyl) polysulfide having an average of from about 3.4 to about 3.8 connecting sulfur groups in its polysulfidic bridge.
[8]Silica coupling agent as X266S ™ from the Degussa Company as a bis (3-triethoxysilylpropyl)polysulfide having an average of about 2.2 to about 2.4 connecting sulfur atoms in its polysulfidic bridge as a 50/50 composite with carbon black and reported in Table 1 as the composite and thus is 50 percent active.
[9]Paraffinic/naphthenic processing oil and paraffin/microcrystalline waxes
[10]Sulfur vulcanization accelerators of the sulfenamide and guanidine types The following Table 2 reports physical data for various physical properties of the Samples. For cured rubber samples, the respective samples were cured for about 23 minutes to a temperature of about 170° C.

TABLE 2

| | Samples | | | |
|---|---|---|---|---|
| | Control A | B | C | D |
| Emulsion SBR's | 60 | 0 | 0 | 0 |
| Siloxane functionalized SBR composite | 0 | 60 | 60 | 60 |
| Silica A (BET = 185 m²/g) | 76 | 76 | 0 | 0 |
| Silica B (BET = 163 m²/g) | 0 | 0 | 83 | 0 |
| Pre-hydrophobated silica B | 0 | 0 | 0 | 84.7 |
| Stress-strain (ATS)[1] | | | | |
| 100% modulus, ring (MPa) | 1.8 | 2.0 | 2.1 | 1.8 |
| 300% modulus, ring (MPa) | 8.9 | 11.6 | 12.6 | 11.8 |
| Tensile strength (MPa) | 16.5 | 15.6 | 14.8 | 15.4 |
| Rebound (%) | | | | |
| 0° C. | 22 | 16 | 19 | 20 |
| 23° C. | 36 | 36 | 41 | 44 |
| 100° C. | 59 | 65 | 69 | 70 |
| DIN abrasion, relative, cc (10 Newtons)[2] | 116 | 120 | 119 | 125 |

[1]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[2]DIN abrasion (relative to a control) according to DIN 53516. The DIN abrasion values are measures of volume loss of a sample upon exposure to an applied abrasive wheel under a load of 10 Newtons. Lower values are indicative of greater resistance to abrasion.

From Table 2 it is observed that the rebound values at 23° C. and 100° C. of 44 and 70, respectively, for Sample D (which employed a combination of the siloxane functionalized SBR rubber and pre-hydrophobated specialized silica aggregates) was significantly higher than the corresponding rebound values at 23° C. and 100° C. for Control Sample A and Samples B and C.

It is important to appreciate that the significantly higher rebound values for Sample D is indicative of significantly lower rolling resistance for a tire having a tread of such rubber composition which, in turn, promotes better fuel economy for an associated vehicle.

From Table 2 it is also observed that the rebound value at 0° C. of 20 for Sample D (which employed a combination of the siloxane functionalized SBR rubber and pre-hydrophobated specialized silica aggregates) was significantly lower than the corresponding rebound value at 0° C. of 22 the Control Sample A which is considered herein to be predictive of good wet traction for a tire with a tread of such rubber composition.

The rubber samples were submitted to an evaporative emissions test (EET) by placing a 5 gram sample into a Tedlar-type gas bag which is fitted with gas sampling valves. The Tedlar gas bag is evacuated and 2000 ml of atmospheric air is injected back into the bag using a gas-tight syringe. The inflated bag containing the rubber sample is then placed in a hot air oven which is operated for a controlled diurnal temperature profile in a range of from 23 to 41° C. over a 24 hour period. For the evaporative emissions test, a bellows metering pump (fitted to the Tedlar-type gas bag) periodically circulates gas from the Tedlar bag, which contains the rubber sample's evaporative emissions, to a gas sampling valve, thence to a GC (gas chromatograph for gaseous analysis) and returns it back to the gas bag.

The following Table 3 reports the evaporative emissions with the results for the Control Sample A being assigned herein to value of 100 and the evaporative emissions for Samples B, C and D being values normalized to the value of 100 for Control Sample A.

TABLE 3

Evaporative Emissions

| | Samples | | | |
|---|---|---|---|---|
| | Control A | B | C | D |
| Ethanol evaporative emission | 100 | 103 | — | 35 |

From Table 3 it can be seen that a significant decrease in ethanol volatile emission was observed for Sample D as compared to Control Sample A as well Sample B, which was about the same as Control Sample A. Note that 4.1 parts of coupling agent composite was used in the formulation as indicated in Table 1 (50 percent active so that actually 2.05 parts of coupling agent was used). Therefore, the minimal in situ formed ethanol was apparently due to the 2 parts of coupling used in the formulation. Ethanol evaporative emission determination not made for Sample C.

Accordingly, it is considered herein that a significant contribution of the pre-hydrophobated silica B both the preparation of the rubber sample which contained the siloxane functionalized elastomer with the aforesaid beneficial tread rubber properties as well as the preparation of the rubber Sample D without an attendant in situ production of the ethanol emission within the elastomer host.

Accordingly, it s considered herein that a tire having a tread of the rubber composition of Sample D can be used for an associated vehicle to have low volatile emissions property in addition to a better fuel economy.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber which is comprised of, based upon parts by weight per 100 parts by weight rubber (phr):
   (A) about 30 to about 80 phr of a siloxane functionalized styrene/butadiene copolymer elastomer composite (SBR composite) comprised of a styrene/butadiene copolymer elastomer (SBR-1) and a siloxane functional styrene/butadiene copolymer elastomer (SBR-2) which contains at least silicon atom within said elastomer with associated pendent alkoxy groups, and optionally hydroxyl groups, from said silicon atom, as a part of the (SBR-2) elastomer chain to thereby divide said elastomer into at least two segments thereof (SBR-2A and SBR-2B) with the silicon atom containing said siloxy group, and optionally said hydroxyl group, therebetween, wherein said SBR composite is thereby comprised of a polymodal molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said elastomer contains from zero to a maximum of ten weight percent of at least one additional styrene/butadiene copolymer elastomer (SBR-3) pendent to said silicon atom and having an number average molecular weight (Mn) of greater than 550,000,
   (B) about 20 to about 70 phr of at least one additional conjugated diene based elastomer selected from the group consisting of polymers of the group consisting one of isoprene or 1,3-butadiene and copolymers of styrene with at least one of isoprene and 1,3-butadiene;
   (C) about 10 to about 120 phr of reinforcing filler for said tread rubber composition wherein said reinforcing filler is comprised of:
      (1) about 40 to about 100 phr of particulate, pre-hydrophobated precipitated silica aggregates having, prior to said pre-hydrophobation, a BET surface area in a range of from about 150 to about 170 $m^2/g$, and
      (2) zero to about 60 phr of rubber reinforcing carbon black;
   wherein said pre-hydrophobated precipitated silica aggregates are precipitated silica aggregates pre-hydrophobated with at least one blocked alkoxyorganomercaptosilane comprised of at least one of 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1- propyl thioacetate; 3-methyldiisopropoxysilyl-1-propyl thioacetate;1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl- I -ethyl)-4-thioacetylnorbornene; 1-(1-oxo-2-thia-5-triethoxysilylpenyl)benzoic acid; 6-triethoxysilyl-1-hexyl thioacetate;1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate;10-triethoxysilyl-1-decyl thioacetate; 1-triethoxysilyl-9-decyl thioacetate;1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctoate; 3-triethoxysilyl-1-propyl thiopalmitate; 3-triethoxysilyl-1-propyl thiooctoate; 3-triethoxysilyl-1-propyl thiobenzoate; 3-triethoxysilyl-1-propyl thio-2-ethylhexanoate;3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; 3-ethoxydidodecyloxy-1-propyl thioacetate; 3-ethoxyditetradecyloxy-1-propyl thioacetate; 3-ethoxydidodecyloxy-1-propyl-thiooctoate or 3-ethoxyditetradecyloxy-1-propyl-thiooctoate.

2. The tire of claim 1 wherein an unblocking agent is included for said blocked alkoxyorganomercaptosilane comprised of at least one of N,N'-diphenylguanidine, N,N'-di-ortho-tolylguanidine, hexamethylenetetramine or 4,4'-diaminodiphenylmethane.

* * * * *